United States Patent

Tandon et al.

Patent Number: 5,148,268
Date of Patent: Sep. 15, 1992

[54] MULTIPLEXING ARRANGEMENT FOR CONTROLLING DATA PRODUCED BY A COLOR IMAGES SENSOR ARRAY

[75] Inventors: Jagdish C. Tandon, Fairport; Yungran Choi, Webster; Scott L. Tewinkle, Ontario, all of N.Y.

[73] Assignee: Xerox Corporation, Stamford, Conn.

[21] Appl. No.: 692,097

[22] Filed: Apr. 26, 1991

[51] Int. Cl.⁵ .................. H04N 9/04; H04N 5/335
[52] U.S. Cl. ................... 358/41; 358/213.11; 358/213.31; 358/75
[58] Field of Search ............ 358/213.11, 213.23, 358/213.25, 213.26, 213.29, 213.31, 213.15, 213.16, 213.18, 213.27, 212, 214, 216, 474, 482, 483, 497, 41, 48, 75

[56] References Cited

U.S. PATENT DOCUMENTS

| | | | |
|---|---|---|---|
| 4,278,995 | 7/1981 | Fearaside et al. | 358/54 |
| 4,322,752 | 3/1982 | Bixby | 358/213 |
| 4,556,800 | 12/1985 | Ohta et al. | 250/578 |
| 4,562,475 | 12/1985 | Levine | 358/213.26 |
| 4,668,333 | 5/1987 | Tandon et al. | 156/633 |
| 4,690,391 | 9/1987 | Stoffel et al. | 269/21 |
| 4,695,716 | 9/1987 | Tandon et al. | 250/211 |
| 4,735,671 | 4/1988 | Stoffel et al. | 156/304.3 |
| 4,737,854 | 4/1988 | Tandon et al. | 358/213.31 |
| 4,745,482 | 5/1982 | Baumeister | 358/213.29 |
| 4,748,514 | 5/1988 | Bell | 358/486 |
| 4,761,683 | 1/1990 | Hasegawa et al. | 358/75 |
| 4,771,333 | 9/1988 | Michaels | 358/213.29 |
| 4,891,690 | 1/1990 | Hasegawa et al. | 358/75 |
| 4,922,337 | 5/1990 | Hunt | 358/213.26 |
| 4,972,255 | 11/1990 | Suzuki et al. | 358/75 |

OTHER PUBLICATIONS

Japanese Patent Application Publication (Kokai) 2-153678.

Primary Examiner—Howard W. Britton
Assistant Examiner—Sherrie Hsia
Attorney, Agent, or Firm—Lisa M. Yamonaco

[57] ABSTRACT

A color image sensor array for both synchronous and asynchronous operation, especially adapted for using fabricated full width arrays, in which the chip has three photosites per pixel. The control circuit for charge transfer uses several components in common and requires no memory buffers to obtain full color information for each pixel on a page being scanned.

15 Claims, 9 Drawing Sheets 5,148,268

MULTIPLEXING ARRANGEMENT FOR CONTROLLING DATA PRODUCED BY A COLOR IMAGES SENSOR ARRAY

CROSS REFERENCE

Cross reference is made to U.S. patent application Ser. No. 07/681,809 to Perregaux et al., entitled "Color Array For Use In Fabricating Full Width Arrays" filed Apr. 8, 1991.

BACKGROUND OF THE INVENTION

The invention relates to color image sensor arrays, and more particularly to a multiplexing arrangement for controlling the data produced by the color image sensor array.

Monochrome image sensor arrays typically comprise a linear array of photodiodes which raster scan an image bearing document and convert the microscopic image area viewed by each photodiode to image signal charges. Following an integration period, the image signals are amplified and transferred to a common output line or bus through successively actuating multiplexing transistors.

To implement a full color array for the above application requires the use of more elaborate sensor arrays. Typically two implementations have been used. One implementation is to use the original monochrome sensor array as described above and place color filters, for instance red, green, blue for full color, on the photodiodes in an alternating manner. Every third photodiode would represent a color separation needing three such separations for one full color pixel. Even though full color images are produced, the resolution of the scan has been decreased by one third and further, each resulting pixel contains information for only one color instead of all three colors as is desirable. A second implementation involves the use of three linear arrays, each array having a color filter, and positioning the three arrays in parallel, one disposed above the other. The resolution is preserved but as the sensor arrays scan the page, memory would be required to delay the color information from two of the arrays to provide full color information for any one pixel. Memory requirements of this magnitude can be expensive to implement and also consume valuable space.

U.S. Pat. No. 4,972,255 to Suzuki et al. discloses a color sensor array containing three rows of photodiodes, each representing a different color. The array is used to gather full color information for an individual scanline without the use of memory. The controls and amplification for each line sensor are replicated three times. U.S. Pat. No. 4,278,995 to Fernside et al. discloses a sensor array containing three rows of photodiodes. The use of delay lines enables full color information for an individual scanline. U.S. Pat. No. 4,737,854 to Tandon et al. discloses an image sensor array having two stage transfer. U.S. Pat. No. 4,761,683 to Matteson et al. discloses a charge transfer system for multiple sensor row arrays using storage. U.S. Pat. No. 4,668,333 to Tandon et al., U.S. Pat. No. 4,690,391 to Stoffel et al., U.S. Pat. No. 4,695,716 to Tandon et al., and U.S. Pat. No. 4,735,671 to Stoffel et al. disclose methods and apparatuses for fabricating full width arrays from single sensor chips. U.S. Pat. No. 4,556,800 to Ohta et al. discloses an optical image sensing apparatus which has grouped photosensors connected in common and also discloses a grouped data transfer method. U.S. Pat. No. 4,745,482 to Baumeister discloses an electronic recorder including and image sensor having a linear array of photosites and a parallel method to read information out of the photosites. U.S. Pat. No. 4,322,752 to Bixby discloses a fast frame readout sensor which formats the sensor into blocks of photosite rows for the purpose of readout. U.S. Pat. No. 4,891,690 to Hasegawa et al. discloses a color sensor apparatus using three image sensors with associated electronics and memory to buffer the red, green and blue information from the sensors. JP-A1-2-153678 (Kyohgoku) discloses a full color sensor system having three linear arrays wherein a common amplifier is used for the three arrays.

SUMMARY OF THE INVENTION

The present invention provides a color sensor array for both synchronous and asynchronous operation, especially adapted for butting with like arrays to form a full width color array, the array having a fast scan direction parallel to the linear axis of the array and a slow scan direction perpendicular to the linear axis, comprising: a first array of sensors each sensor having a fast scan pitch a; a second array of sensors each sensor having a fast scan pitch a, the second array disposed below the first array a slow scan pitch distance $a/3$ therefrom; a third array of sensors each sensor having a fast scan pitch a, the third array disposed below the second array a slow scan pitch distance $a/3$ therefrom; a common output bus to which the image signal charges accumulated by the first array of sensors, the second array of sensors, and the third array of sensors, during an integration period are transferred to; a two stage transfer circuit coupling each of the first array of sensors, the second array of sensors and third array of sensors, with the output bus, the transfer circuit having three first and one second transistors disposed in series with one another; amplifier means between the second transistor and the output bus for amplifying the image signal charges output by the sensors.

IN THE DRAWINGS

Figure 1:
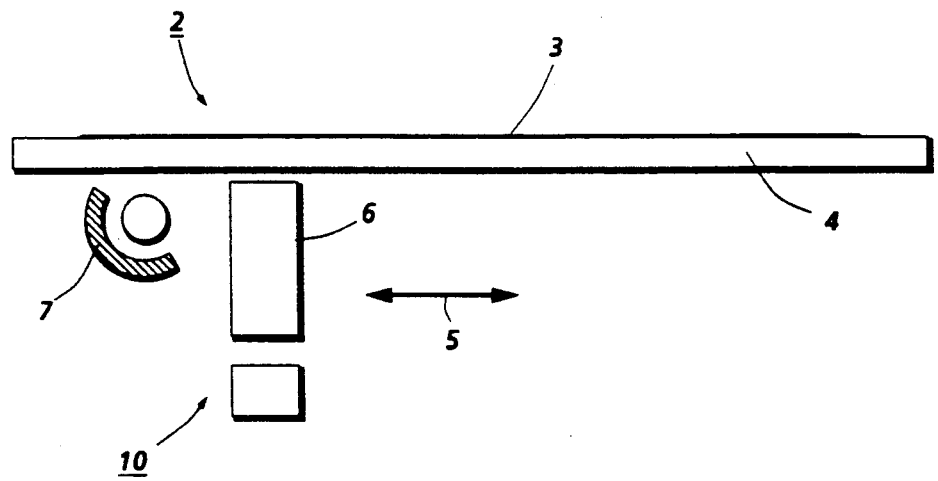
FIG. 1 is a schematic view of a raster input scanner having a full width array.

Referring to FIG. 1, there is shown an exemplary raster input scanner, designated generally by the numeral 2, of the type adapted to use the scanning array 10 of the present invention. Array 10 comprises a linear full width array having a scan width in the fast scan direction substantially equal to or slightly greater than the width of the largest document 3 to be scanned. Documents to be scanned are supported on a generally rectangular transparent platen 4, typically glass, sized to accommodate the largest original document 3 to be scanned. A document 3 to be scanned is located either manually or by a suitable automatic document handler or feeder (not shown) on platen 4 for scanning. Array 10 is supported for reciprocating scanning movement in the slow scan direction (i.e. y direction) depicted by arrows 5 below platen 4 by a movable scanning carriage (not shown). A lens 6 focuses array 10 on a line like area, in the fast scan direction (i.e. x direction), extending across the width of platen 4. One or more lamp and reflector assemblies 7 are provided for illuminating the line-like area on which array 10 is focused.

Figure 2:
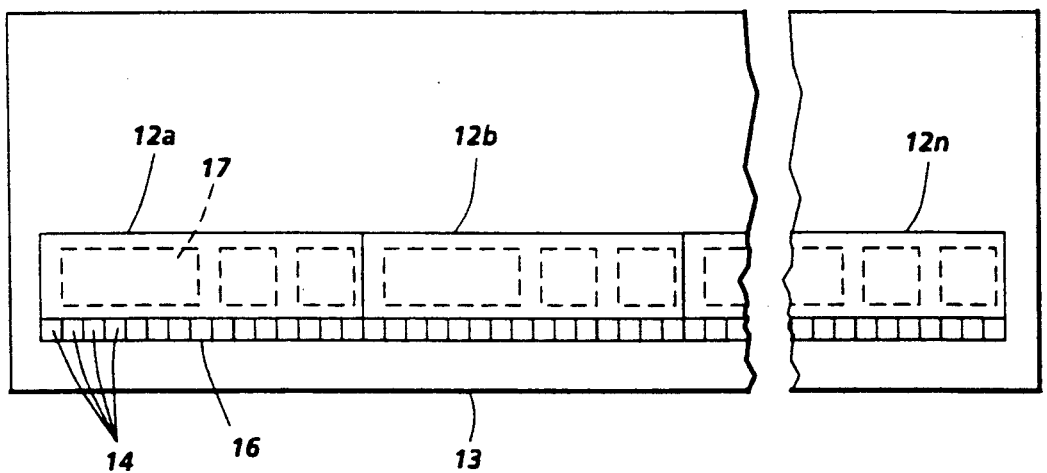
FIG. 2 is a top view illustrating a full width color array of the type fabricated by abutting a plurality of chips of the present invention together.

Referring to FIG. 2, there is shown a long or full width scanning array 10 composed of a plurality of smaller sensor chip 12 assembled together end-to-end (specific chips are identified by numerals 12a, 12b, ... 12n) on an elongated generally rectangular rigid substrate 13. U.S. Pat. No. 4,668,333 to Tandon et al., U.S. Pat. No. 4,690,391 to Stoffel et al., U.S. Pat. No. 4,695,716 to Tandon et al., and U.S. Pat. No. 4,735,671 to Stoffel et al. disclose methods and apparatuses for fabricating full width arrays from single sensor chips. An electrically conductive metallic covering or coating such as copper may be provided on the surface of substrate 13 to which the chips 12 are attached to provide the required ground connection and EMI immunity.

Chips 12, which may, for example, be Charge Coupled Devices (CCDs) or MOS sensor arrays, are relatively thin silicon dies having a generally rectangular shape. A row 16 of photosite areas 14 parallel the longitudinal axis of the chips. While a single row 16 of photosite areas 14 is shown, plural photosite area rows may be contemplated. Other active elements such as shift registers, gates, pixel clock, etc., (designated generally by the numeral 17 herein) are preferably formed integrally with chips 12. Suitable external connectors (not shown) are provided for electrically coupling the chips 12 to related external circuitry.

In the case of color scanning however, the individual photosite areas are subdivided into three photodiodes, enabling the photosite areas to detect three different wavelength ranges. Normally, these comprise the three primary colors, i.e., blue, green, and red. While the invention is described in the context of the three primary colors, the invention is not limited to those colors or color combination. Other colors and color combinations such as cyan, magenta and yellow, etc. may instead be envisioned. Also, while a three color sensor is disclosed, color sensors containing photodiodes of any number may be envisioned.

Figure 3:
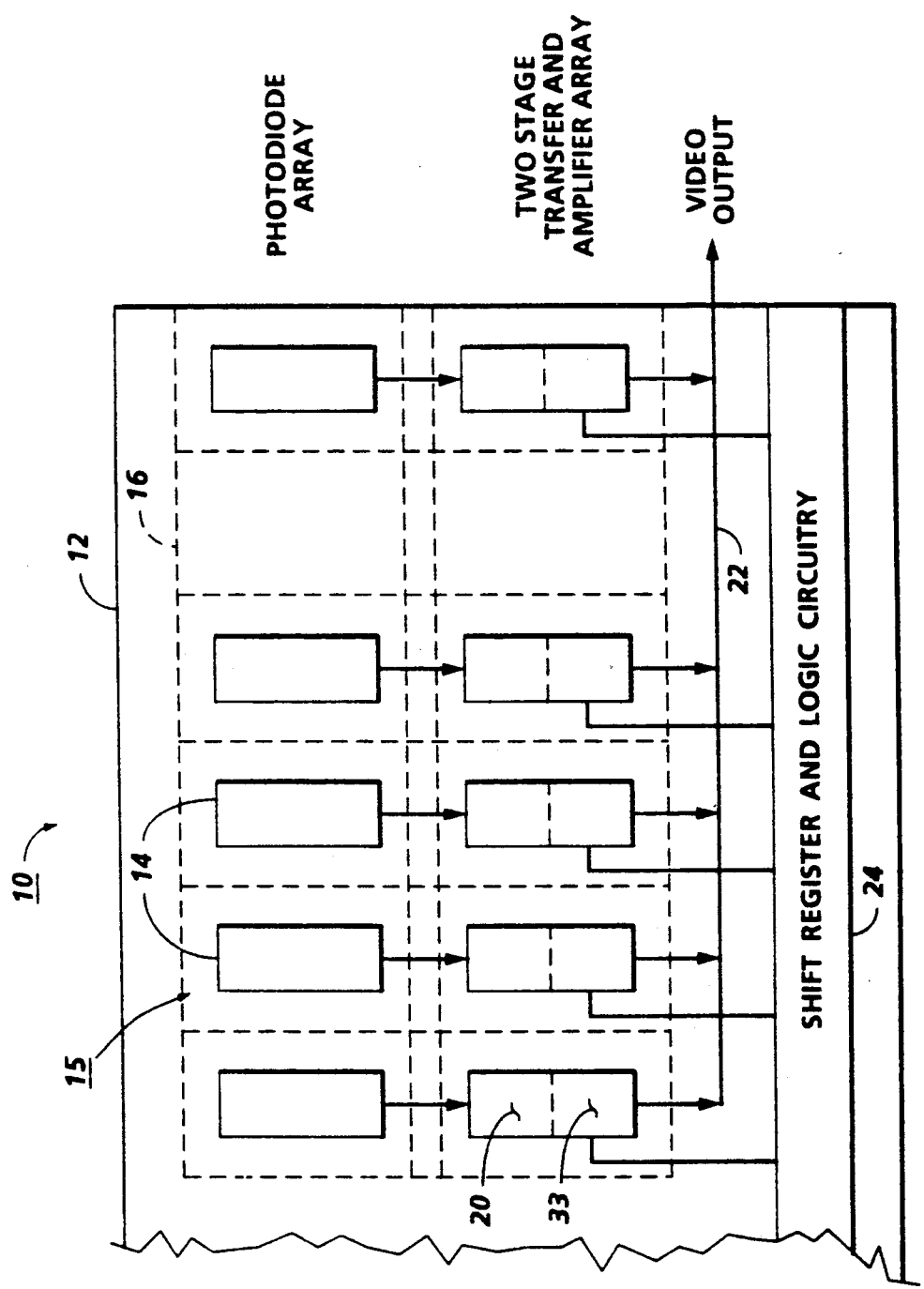
FIG. 3 is a schematic view of an image scanning array having an array of photosite cell, each cell having a photodiode area with a two stage transfer circuit and an amplifier for transferring image signal charges from the photodiode areas to a common output bus.
Figure 4:
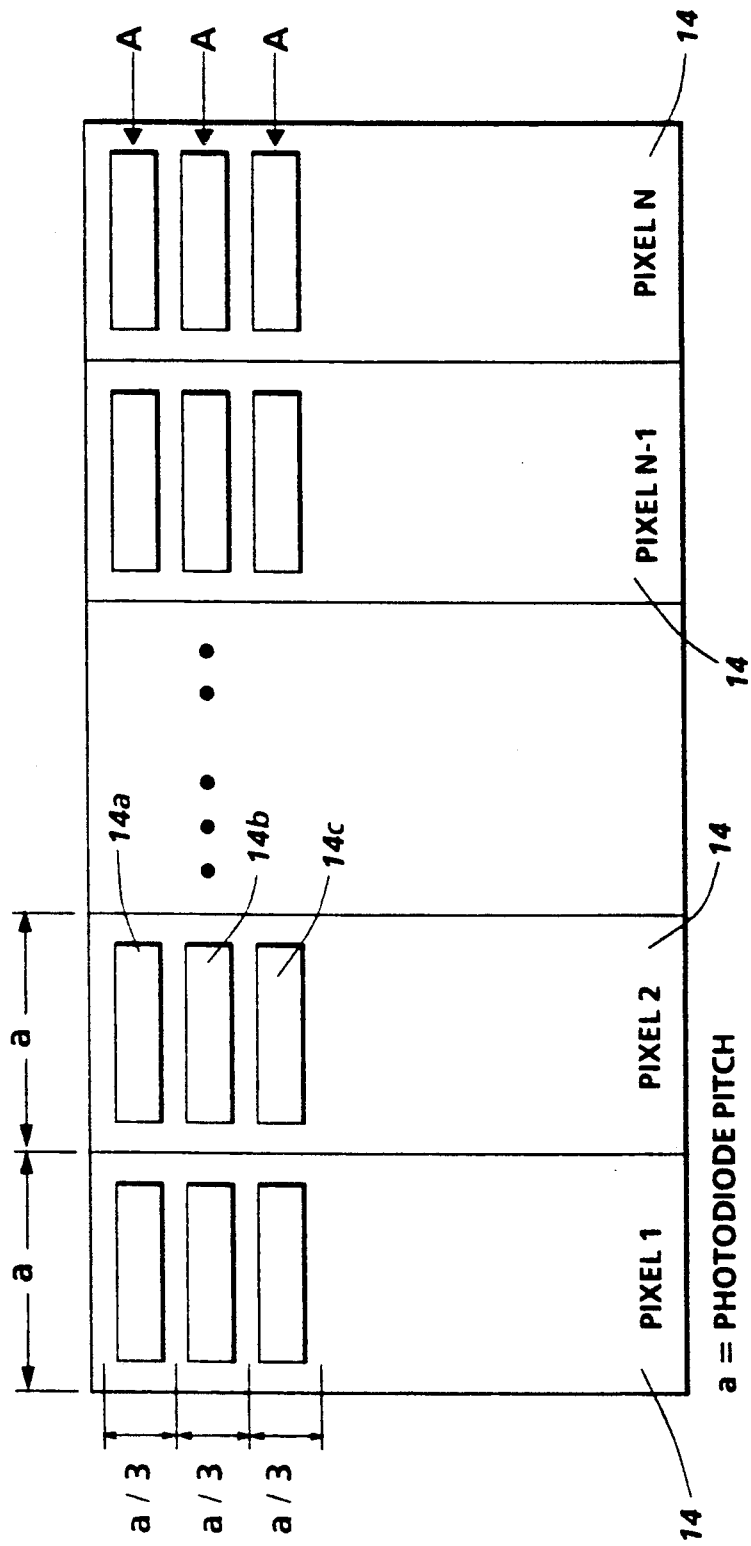
FIG. 4 is a block diagram further depicting the photosite area of FIG. 3.

Referring to FIGS. 3 and 4, there is shown the color image sensor array with two stage transfer, designated generally by the numeral 10. Image sensor array 10 includes a base or chip 12 of silicon with a plurality of photosite areas 14 thereon. Photosite areas 14 are in closely spaced juxtaposition with one another on chip 12 in a linear array or row 16. As previously mentioned, several smaller arrays can be abutted together end to end with one another to form a longer array, i.e. a full width or contact array, with spacing between the photodiodes at the butted ends the same as the spacing between the photodiodes inside the chip thereby maintaining photodiode pitch, designated by the letter a, across the entire full width of the composite array.

Photosite area 14 includes photodiodes 14a, 14b, 14c representing the three primary colors, are spaced a pitch distance a in the fast scan direction and a/3 in the slow scan direction. The constant pitch, a/3, between photodiodes 14a, 14b, 14c make this configuration less sensitive to document scanning speed fluctuation compared to a color sensor array with larger gaps between rows. Photodiodes 14a, 14b, 14c are shaped providing a fairly symmetric MTF as described in U.S. Pat. application Ser. No. 07/681,809 to Perregaux et al., entitled "Color Array For Use In Fabricating Full Width Arrays" filed Apr. 8, 1991 the disclosure of which is hereby incorporated by reference.

While photodiodes 14a, 14b, 14c are shown and described herein, other photosite types such as amorphous silicon or transparent electrode MOS type photosites may be envisioned. Further, while a one dimensional sensor array having a single row 16 of photosite areas 14 is shown and described herein, a two dimensional sensor array with plural rows of photosite areas may be contemplated.

Each photosite area 14 has a two stage transfer circuit 20 associated therewith which together with the photodiode area and an amplifier 33 form a photosite cell 15 at the array front end. In each cell 15, the image signal charge from the photodiode area is transferred by circuit 20 to amplifier 33 where the image signal charge from photodiode area 14 is amplified to bring the image signal charge to a desired potential level prior to transferring the charge to a common video output line or bus 22. Suitable shift register and logic circuitry 24 provide timing control signals P×Sel for connecting each pixel cell 15 to bus 22 in the proper timed sequence.

Image sensor array 10 may for example be used to raster scan a document original as in FIG. 1, and in that application, the document original and the sensor array 10 are moved or stepped relative to one another in the slow scan direction that is normally perpendicular to the linear axis of array 10. At the same time, the array scans the document original line by line in the fast scan direction parallel to the linear axis of the array. The image line being scanned is illuminated and light from the document is focused onto the photodiodes in photodiode area 14. During an integration period, a charge is developed on each photodiode proportional to the reflectance of the image area viewed by each photodiode. The image signal charges are thereafter transferred by two stage transfer circuits 20 via amplifier 33 to output bus 22 in a predetermined step by step timed sequence.

To obviate the effect of different transistor threshold voltages and enhance uniformity, the present invention utilizes a two stage transistor transfer configuration. Two stage transfer circuits are further explained in copending U.S. Pat. application Ser. No. 07/632,814 to Tandon et al. entitled "Image Sensor Array Using Two Stage Transfer Having Improved Uniformity" filed Dec. 24, 1990, and U.S. Patent application Ser. No. 07/632,802 to Hayes et al. entitled "Sensor Array With Improved Uniformity" filed Dec. 24, 1990, the disclosures of which are hereby incorporated by reference.

In the ensuing description, all transistors shown are N-channel type. However, P-channel transistors may instead be used with appropriate voltage level changes as will be understood.

Figure 5:
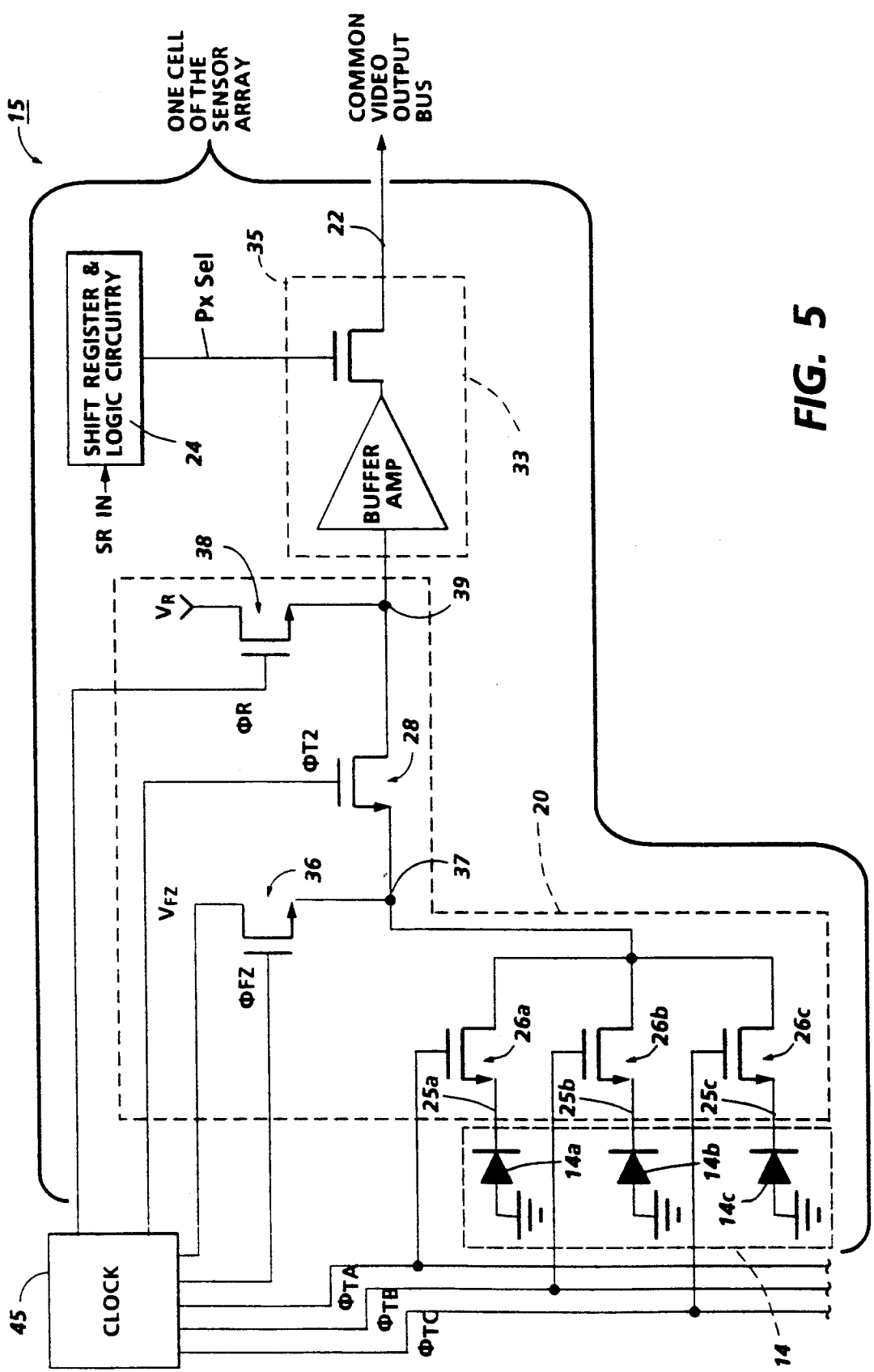
FIG. 5 is a circuit schematic showing a pixel cell.
Figure 6:
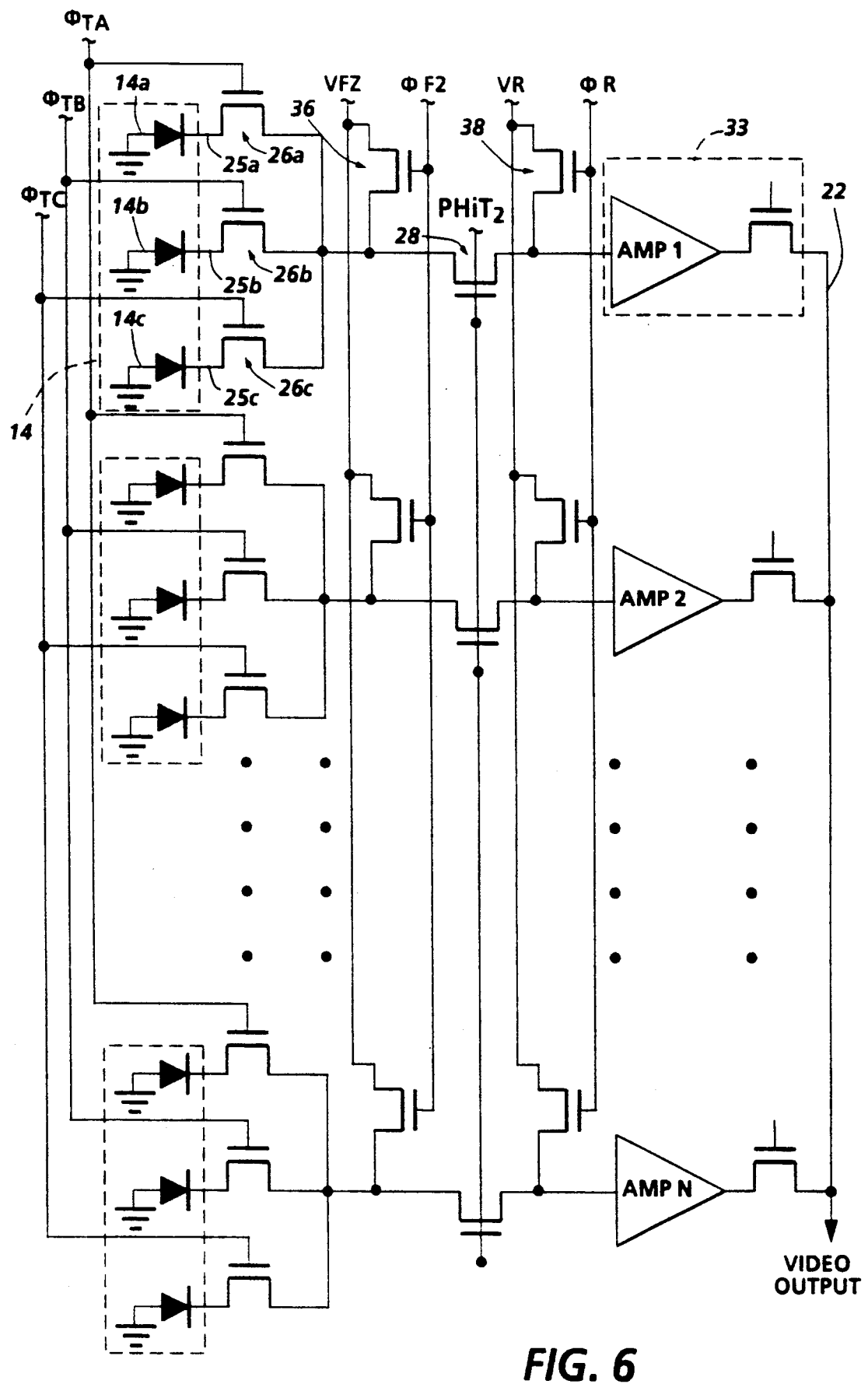
FIG. 6 is a schematic view depicting an array of pixel cells.

Referring particularly to FIGS. 2, 5-6 where like numerals designate like elements, the two stage transfer circuit 20 associated with each cell 15 has first-stage transfer transistors 26a, 26b, 26c, and second-stage transfer transistor 28 for transferring the image signal charge from the photodiodes 14a, 14b, 14c to amplifier 33. Transistors 26a, 26b, 26c are in series with lines 25a, 25b, 25c connecting one electrode of photodiodes 14a, 14b, 14c with the input gate of amplifier 33. The other electrode of photodiodes 14a, 14b, 14c is grounded. A bias charge injection transistor 36 is provided to inject a bias charge, for example, an electrical fat zero $V_{FZ}$, to line 25 at middle node 37. A reset transistor 38 controls the reset voltage $V_R$ at the node 39 between transistor 28 and amplifier 33.

A suitable clock 45 provides a suitable source pulses $\Phi_R$, $\Phi_{tA}$, $\Phi_{tB}$, $\Phi_{tC}$, $\Phi_{t2}$, $\Phi_{FZ}$, and $V_{FZ}$. Pulses $\Phi_{tA}$, $\Phi_{tB}$, $\Phi_{tC}$, $\Phi_{FZ}$, and $V_{FZ}$ provide for injection of the bias charge into lines 25a, 25b, 25c and pulses $\Phi_{t2}$ and $\Phi_R$ for setting node 39 to voltage $V_R$. As will appear, pulses $\Phi_{tA}$, $\Phi_{tB}$, $\Phi_{tC}$, of different amplitude are provided for transferring the image signal charges from photodiodes 14a, 14b, 14c to amplifiers 33. The P×Sel signals used for multiplexing the amplified charge output by amplifier 33 onto the common video output bus 22 are provided by shift register and logic circuitry 24.

In operation and referring particularly to FIGS. 5-7, during time interval $t_1-t_2$, pulse $\Phi_R$ actuates reset transistor 38 to apply reset voltage $V_R$ to node 39 to reset the input to amplifier 33. Subsequently, at time interval $t_3-t_4$, pulse $\Phi_{tA}$ and $\Phi_{t2}$ actuate transistors 26a and 28 respectively of two stage transfer circuit 20 to transfer the image signal charge accumulated on the photodiode 14a of each cell 15 to amplifiers 33. To facilitate transfer of the image signal charges, the amplitude $V(\Phi_{tA1})$ of waveform $\Phi_{tA}$ is smaller than the amplitude $V(\Phi_{t2})$ of pulse $\Phi_{t2}$. During injection of the bias charge, at time $t_5$, the $\Phi_{tA}$ and $\Phi_{FZ}$ pulses go high while pulse $V_{FZ}$ goes low. Following preset intervals at times $t_6$, $t_7$, and $t_8$, the pulses $V_{FZ}$, $\Phi_{tA}$, and $\Phi_{FZ}$ return to their nominal level.

Figure 7A:
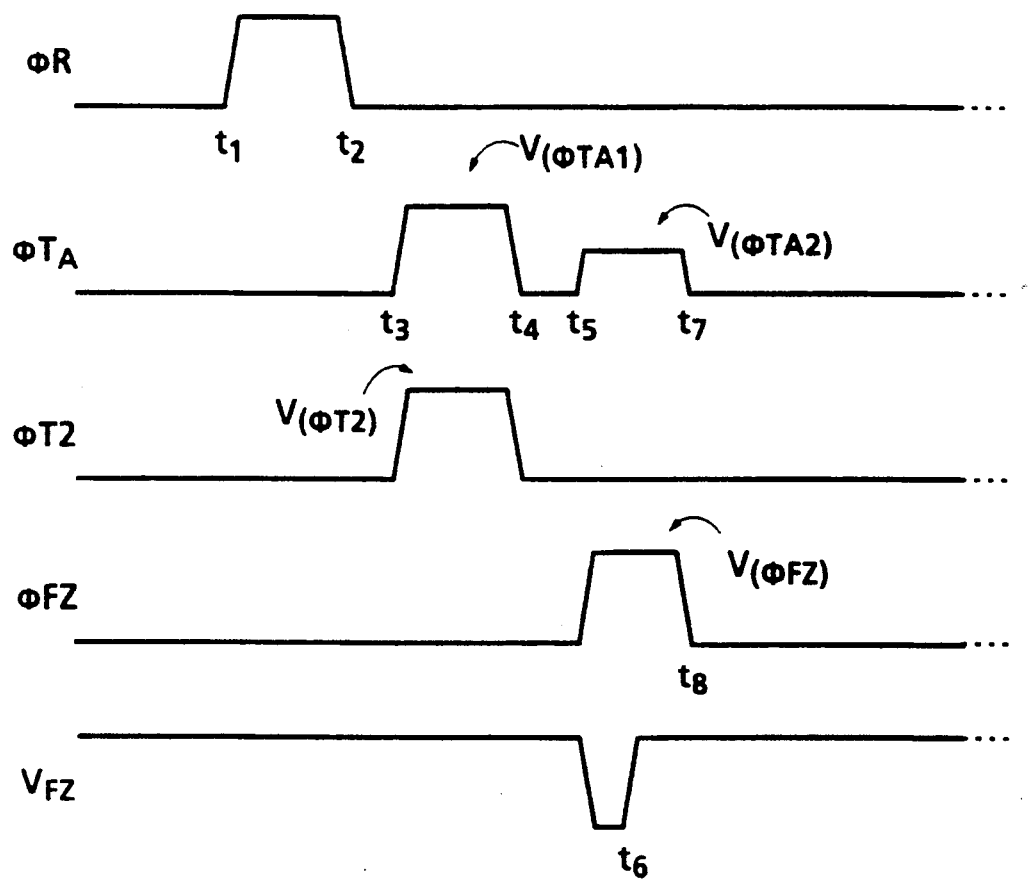
FIGS. 7A and 7B are timing diagrams showing the operation of the present invention a synchronous manner.
Figure 7B:
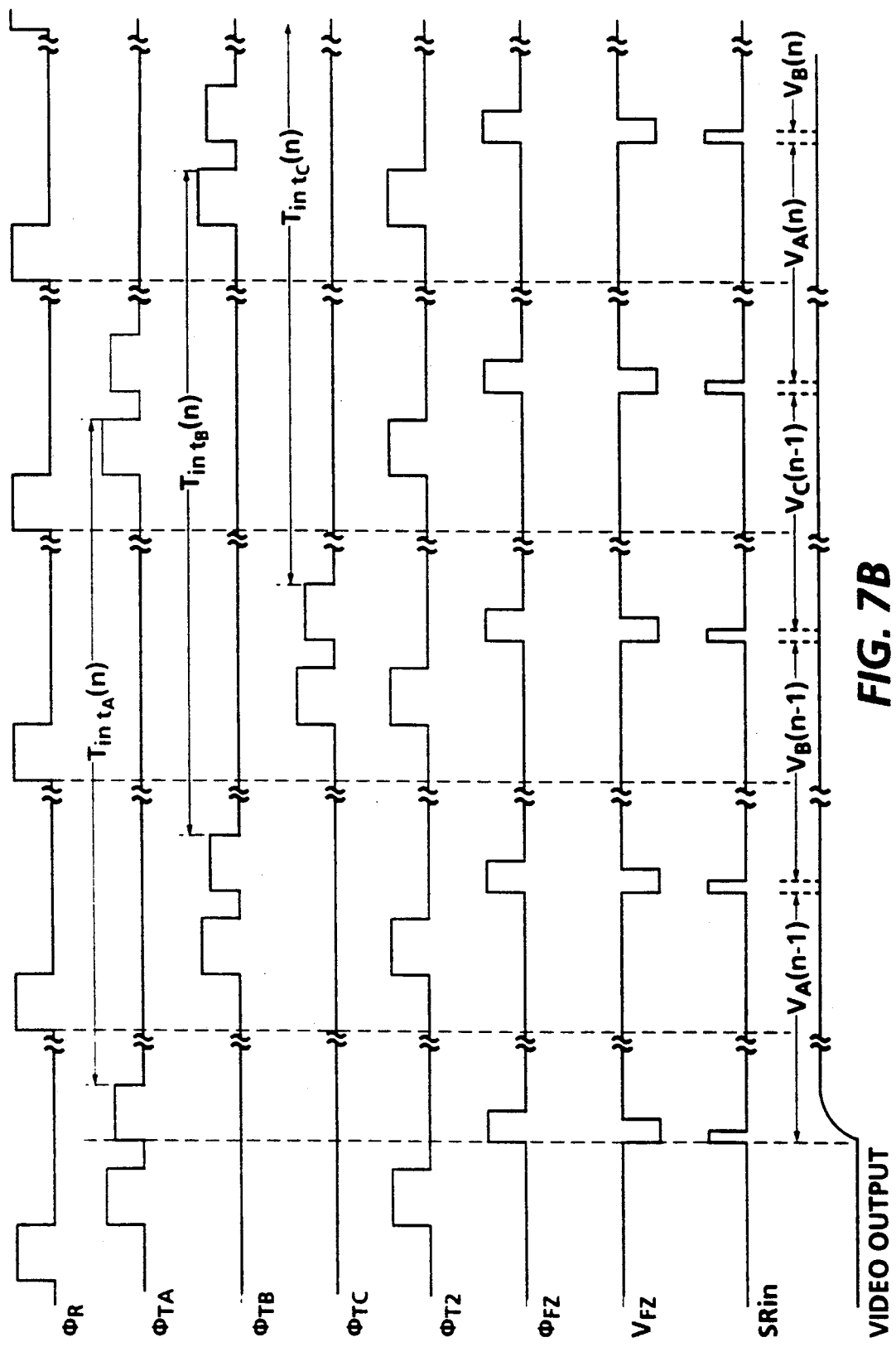

After the full cycle depicted in FIG. 7A is completed for transferring charge from photodiode 14a using signal $\Phi_{tA}$, to amplifier 33, the cycle repeats itself transferring charge from photodiodes 14b, and 14c, using signals $\Phi_{tB}$, $\Phi_{tC}$, as shown in FIG. 7B. Charge from photodiode 14b is transferred via intermediate transistor 28 to the input of amplifier 33. Outputs of amplifiers 15 on array 10 are sequentially read out to Video bus 22. Then, charge from photodiode 14c is transferred to amplifier 33 for transfer to Video bus 22 as shown. Assuming motion of scanning array moves in the slow scan direction as previously shown, integration times $T_{intA}$, $T_{intB}$ and $T_{intC}$ are shifted by ⅓ of the integration time from each other. Thus, the signal integrated by photosites 14a, 14b, 14c correspond to the same line on the image being scanned. This feature eliminates the need for either on chip or off chip storage to obtain full color information corresponding to the same scanline on the document.

As can be appreciated, in cell 15 and in accordance with the invention, each group of three photodiodes 14a, 14b, 14c share a common bias charge transistor 36, second-stage transfer transistor 28, reset transistor 38, and amplifier 33. Transfer gates 26a, 26b, 26c, which are controlled by clocks $\Phi_{tA}$, $\Phi_{tB}$, $\Phi_{tC}$, along with photodiodes 14a, 14b, 14c are the only elements repeated for a full color implementation thus, the remaining elements in cell 5 are used three times, once for each color. Therefore, the increase in chip size for the full color sensing of this configuration is minimal compared to repeating all the elements of cell 15 three times as shown in much of the prior art. Smaller chip size in turn increases production yields and lowers cost.

Figure 8:
FIG. 8 is a schematic view showing the scanner in FIG. 1 connected to a computer.
Figure 9:
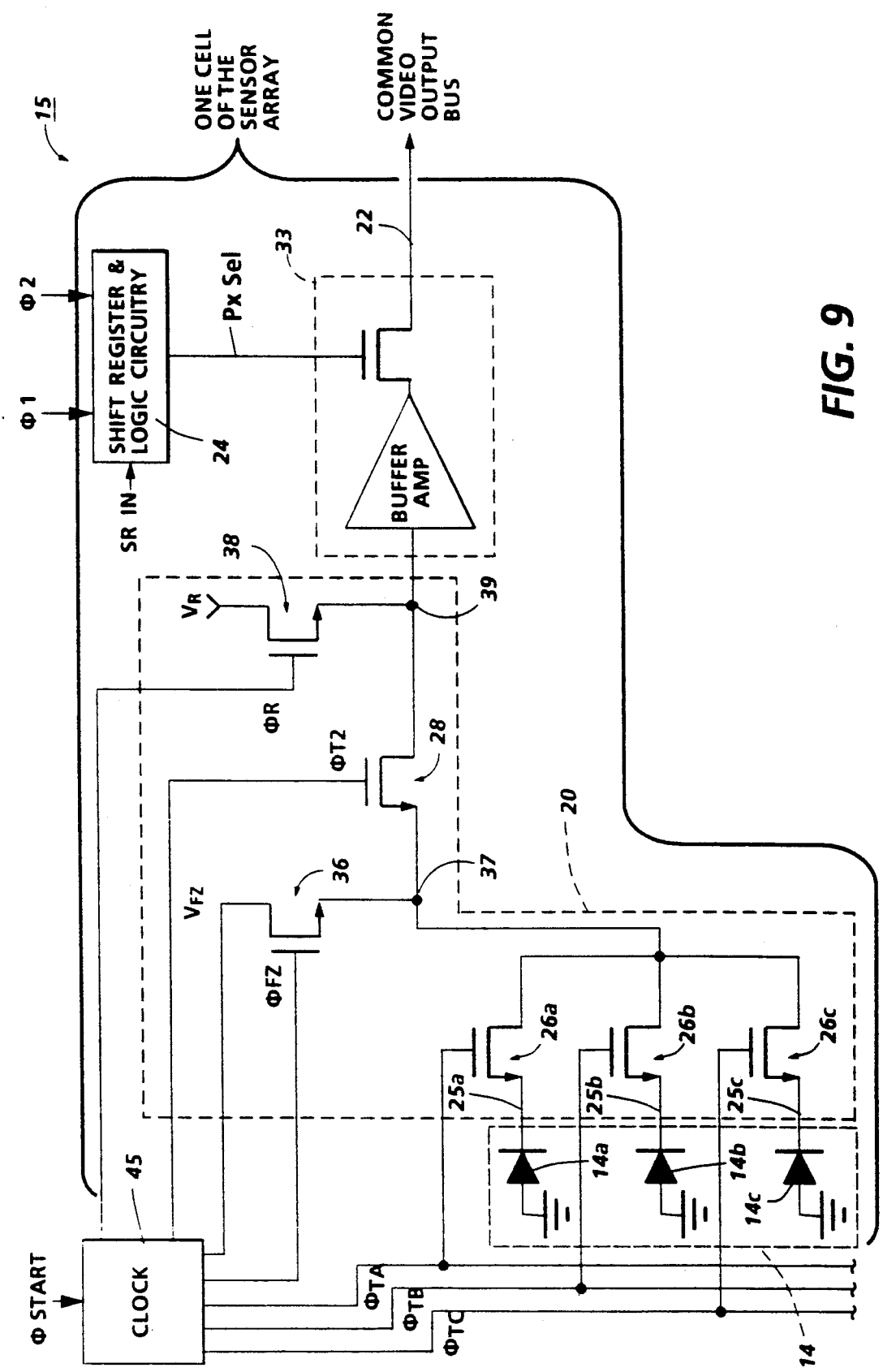
FIG. 9 is a circuit schematic showing a pixel cell for use in an asynchronous manner.
Figure 10:
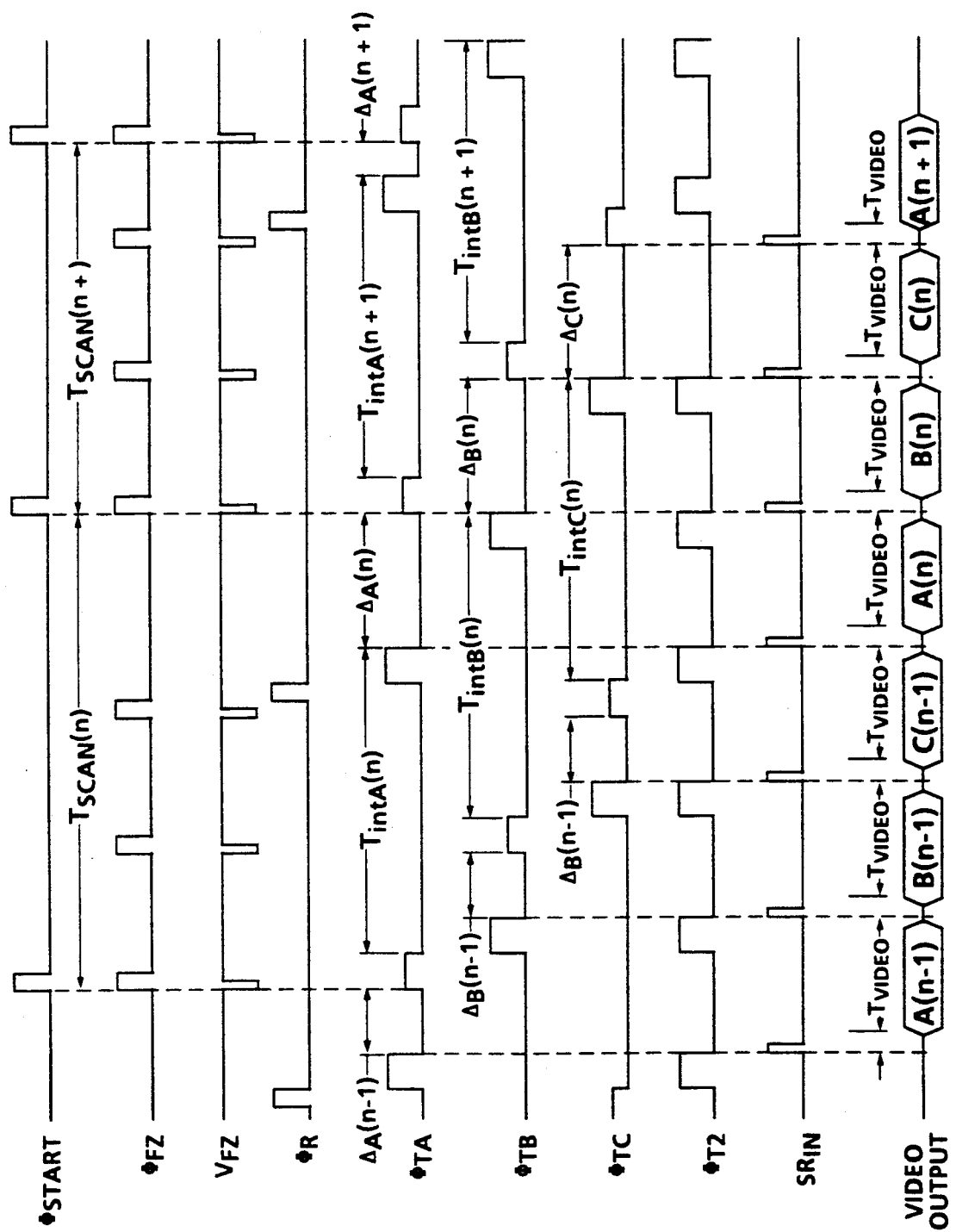
FIG. 10 is a timing diagram showing the operation of the present invention in an asynchronous manner.

Referring now to FIGS. 8-10, a further advantage of sensor array 10 and in accordance with another aspect or the invention, is that it can be used in a synchronous embodiment as described above and in an asynchronous embodiment as shown in FIG. 8. An asynchronously operating array occurs where a scanner such as scanner 2 is connected to a computer such as a personal computer 75. Usually computers such as computer 75 can accept only small amounts of data at a time. Thus, it is desirable that scanner 2 be operated to only do scanning when computer 75 is ready to accept the data. Another example involves a scanner where the motion of the scan head is not very uniform and the samples taken in the slow scan direction will be unevenly spaced if the sensor array were operated in a synchronous fashion. Further information on the operation of asynchronous arrays is described in U.S. patent application Ser. No. 07/632,816 to Tandon entitled "A Sensor Array For Both Synchronous And Asynchronous Operation" filed Dec. 24, 1990, the disclosure of which is hereby incorporated by reference.

Referring to FIGS. 9 and 10, to provide an array for both synchronous and asynchronous operation, array 10 is designed to accept and respond to a start pulse $\Phi_{START}$ output by the user such as computer 75 on a demand for a line of image signals. Where $\Phi_{START}$ is continuous, the clock cycles are repeated and array 10 operates as a synchronous array. Where $\Phi_{START}$ is intermittent, array 10 operates as an asynchronous array. On receipt of start pulse $\Phi_{START}$, a single clock cycle is initiated during which the array 10 integrates the image content of a single line to provide a line of image signals for output to bus 22. The video output bus 22 is output to CPU 75 via image processing circuitry (not shown).

On a start pulse $\Phi_{START}$ output by the user such as computer 75 on a demand for a line of image signals, a single clock cycle is initiated during which the array 10 integrates the image content of a single line for output to bus 22. On receipt of start pulse $\Phi_{START}$, a relatively low pulse $\Phi_{tA}$ is applied to transistors 26a to enable charge bias $V_{fz}$ to be applied to the photodiode 14a in response to charge bias pulse $\Phi_{FZ}$. Following biasing of the array photodiodes 14a, an integration period $T_{intA}$ is entered during which the image line viewed by array 10 is integrated to provide image signal charges representative of the image on the array photodiodes 14a. During the integration period $T_{intA}$ and before charge transfer, amplifiers 33 are reset by application of reset voltage $V_R$ in response to reset pulse $\Phi_R$. Following the integration period, relatively higher amplitude charge transfer pulses $\Phi_{tA}$, together with charge transfer pulses $\Phi_{t2}$ effect two stage transfer of the charges accumulated on photodiode 14a to amplifiers 33. Shift register clock pulse $SR_{IN}$ generates pixel select pulses P×Sel to connect the output voltages of amplifiers 33 to line 22 and image processing circuit 36. At the end of the cycle for $\Phi_{tA}$, the cycles for transferring charge from photodiodes 14b, 14c using clocks $\Phi_{tB}$, $\Phi_{tC}$ respectively, and integration times $T_{intB}$, $T_{intC}$ are initiated in the same fashion as described above and shown in FIG. 10. The relationships of $SR_{IN}$ and $\Phi_{t2}$ to $\Phi_{tA}$, $\Phi_{tB}$, $\Phi_{tC}$ in FIG. 10 are the same as described for FIG. 7. Similarly, the relationships of $\Phi_{FZ}$ and $V_{FZ}$ to $\Phi_{tA}$, $\Phi_{tB}$, $\Phi_{tC}$ in FIG. 10 are the same as described for FIG. 7.

As in the embodiments of FIGS. 5 and 6, array 10 operates as a synchronous array so long as the start pulse $\Phi_{START}$ continuous without interruption. Where the start pulse $\Phi_{START}$ is intermittent, array 10 operates as an asynchronous array. Video output data is always available after the falling edge of $\Phi_{t2}$ and is independent of $T_{SCAN}$. As shown in FIG. 10, for asynchronous operation $T_{SCAN}(n) \neq T_{SCAN}(n+1)$. However, $T_{intA}(n) = T_{intA}(n+1) = T_{intB}(n) = T_{intB}(n=1) = T_{intC}(n) = T_{intC}(n+1)$. $T_{int}$ is constant from $T_{SCAN}$ to $T_{SCAN}$. Therefore it is implied that $\Delta A(n) = \Delta B(n) = \Delta C(n)$ and $\Delta A(n+1) = \Delta B(n+1) = \Delta C(n+1)$ but $\Delta A(n) \neq \Delta A(n+1)$, $\Delta B(n) \neq \Delta B(n+1)$, $\Delta C(n) \neq \Delta C(n+1)$ providing for asynchronous operation. Note that $\Delta A(n) = \Delta A(n+1)$, $\Delta B(n) = \Delta B(n+1)$, $\Delta C(n) = \Delta C(n+1)$ for synchronous operation.

While the invention has been described with reference to the structures disclosed, it is not confined to the details set forth, but is intended to cover such modifications or changes as may come within the scope of the following claims.

We claim:

1. A process for transferring image charges from color sensor chips, in which said sensor chips have a first array of sensors depicting one color, a second array of sensors depicting a second color and a third array of sensors depicting a third color; a common output bus to which image charges accumulated by said first array of sensors are transferred to during ⅓ of an integration period, to which image charge from said second array of sensors are transferred to during ⅓ of an integration period, and to which image charge from said third array of sensors are transferred to during ⅓ of an integration period; a two stage transfer circuit coupling each of said sensors on a chip with said output bus, said two stage transfer circuit having a first first-stage transistor for every sensor in said first array of sensors disposed in series with a common second-stage transistor, a second first-stage transistor for every sensor in said second array of sensors disposed in series with said common second-stage transistor, and a third first-stage transistor for every sensor in said third array of sensors disposed in series connection with said common second-stage transistor; and an amplifier between said common second-stage transistor and said output bus for amplifying the image charges output by said sensors, comprising the steps of:

a) providing a bias charge for application to a node between said first first-stage transistor and said common second-stage transistors of said two stage transfer circuits for use in setting the bias charge on said first array of sensors;

b) concurrently applying a bias charge transfer pulse to said first first-stage transistor of each of said two stage transfer circuits, said first first-stage transistors operable as metering gates to inject a limited amount of said bias charge on said first array of sensors independently of the first first-stage transistors threshold voltages;

c) applying a reset voltage to a node between said common second transistor and said amplifier of each of said two stage transfer circuits at the input of said amplifiers to reset said amplifiers for transfer of the image signal charges from said first array of sensors to said amplifiers;

d) thereafter, applying an image signal charge transfer pulse having an amplitude different from the amplitude of said bias charge transfer pulse to said first first-stage and said common second transistors of said two stage transfer circuits to pass the image signal charges accumulated on said first array of sensors to said amplifiers for amplification and transfer to said output bus;

e) providing a bias charge for application to a node between said second first-stage transistor and said common second-stage transistors of said two stage transfer circuits for use in setting the bias charge on said second array of sensors;

f) concurrently applying a bias charge transfer pulse to said second first-stage transistor of each of said two stage transfer circuits so that said second first-stage transistors function as metering gates to inject a limited amount of said bias charge on said second array of sensors independently of said second first-stage transistors threshold voltages;

g) applying a reset voltage to a node between said common second transistor and said amplifier of each of said two stage transfer circuits at the input of said amplifiers to reset said amplifiers for transfer of the image signal charges from said first array of sensors to said amplifiers;

h) thereafter, applying an image signal charge transfer pulse having an amplitude different from the amplitude of said bias charge transfer pulse to said second first-stage and said common second transistors of said two stage transfer circuits to pass the image signal charges accumulated on said second array of sensors to said amplifiers for amplification and transfer to said output bus;

i) providing a bias charge for application to a node between said third first-stage transistor and said common second-stage transistors of said two stage transfer circuits for use in setting the bias charge on said third array of sensors;

j) concurrently applying a bias charge transfer pulse to said third first-stage transistor of each of said two stage transfer circuits so that said third first-stage transistors function as metering gates to inject a limited amount of said bias charge on said third array of sensors independently of said third first-stage transistor threshold voltages;

k) applying a reset voltage to a node between said common second transistor and said amplifier of each of said two stage transfer circuits at the input of said amplifiers to reset said amplifiers for transfer of the image signal charges from said third array of sensors to said amplifiers; and l) thereafter, applying an image signal charge transfer pulse having an amplitude different from the amplitude of said bias charge transfer pulse to said third first-stage and said common second transistors of said two stage transfer circuits to pass the image signal charges accumulated on said third array of sensors to said amplifiers for amplification and transfer to said output bus.

2. A color sensor array for both synchronous and asynchronous operation, especially adapted for butting with like arrays to form a full width color array, said array having a fast scan direction parallel to the linear axis of said array and a slow scan direction perpendicular to said linear axis, comprising:

a) a first array of sensors each sensor having a fast scan pitch a;

b) a second array of sensors each sensor having a fast scan pitch a, said second array disposed below said first array a slow scan pitch distance a/3 therefrom;

c) a third array of sensors each sensor having a fast scan pitch a, said third array disposed below said second array a slow scan pitch distance a/3 therefrom;

d) a common output bus to which the image signal charges accumulated by said first array of sensors, said second array of sensors, and said third array of sensors, during an integration period are transferred to;

e) a two stage transfer circuit coupling each of said first array of sensors, said second array of sensors and said third array of sensors, with said output bus, said transfer circuit having three first and one second transistors disposed in series with one another;

f) amplifier means between said second transistor and said output bus for amplifying the image signal charges output by said sensors;

g) first means providing a bias charge for application to a node between said first and second transistors of said two stage transfer circuits for use in setting the bias charge on said sensors;

h) second means providing a bias charge transfer pulse to the first transistor of each of said two stage transfer circuits so that said first transistors function as metering gates to inject a limited amount of said bias charge on said sensors independently of the first transistors threshold voltages;

i) third means providing a reset voltage to a node between the second transistor and the amplifier of each of said two stage transfer circuits to reset said amplifiers for transfer of the image signal charges from said sensors to said amplifiers following application of said bias charge; and j) fourth means for subsequently applying an image signal charge transfer pulse to said first and second transistors of said two stage transfer circuits to pass the image signal charges accumulated on said first array of sensors, said second array of sensors and said third array of sensors to said amplifiers for amplification and transfer to said output bus, said image signal charge transfer pulse applied by said fourth means being different than the bias charge transfer pulse provided by said second means.

3. The color array according to claim 2 in which said first array of sensors is blue, said second array of sensors is green and said third array of sensors is red.

4. The color array according to claim 2 in which said first array of sensors is blue, said second array of sensors is red and said third array of sensors is green.

5. The color array according to claim 2 in which said first array of sensors is red, said second array of sensors is green and said third array of sensors is blue.

6. The color array according to claim 2 in which said first array of sensors is red, said second array of sensors is blue and said third array of sensors is green.

7. The color array according to claim 2 in which said first array of sensors is green, said second array of sensors is blue and said third array of sensors is red.

8. The color array according to claim 2 in which said first array of sensors is green, said second array of sensors is red and said third array of sensors is blue.

9. A color sensor array for both synchronous and asynchronous operation, especially adapted for butting with like arrays to form a full width color array, said array having a fast scan direction parallel to the linear axis of said array and a slow scan direction perpendicular to said linear axis, comprising:

a) a plurality of sensor chips, each of said sensor chips having a plurality of pixel cells having a fast scan pitch a, said pixel cell comprising in combination:

1) a first photo sensitive element having a first and second electrode, said first electrode connected to ground;

2) a second photo sensitive element disposed below said first photo sensitive element a slow scan pitch distance a/3 therefrom, said second photo sensitive element having a first and second electrode, said first electrode connected to ground;

3) a third photo sensitive element disposed below said second photo sensitive element a slow scan pitch distance a/3 therefrom, said third photo sensitive element having a first and second electrode, said first electrode connected to ground;

4) a first first-stage transfer transistor having a gate, a source, and a drain, said source of said first first-stage transfer transistor connected to said second electrode of said first photo sensitive element;

5) a second first-stage transfer transistor having a gate, a source, and a drain, said source of said second first-stage transfer transistor connected to said second electrode of said second photo sensitive element;

6) a third first-stage transfer transistor having a gate, a source, and a drain, said source of said third first-stage transfer transistor connected to said second electrode of said third photo sensitive element;

7) a second-stage transfer transistor having a gate, a source and a drain;

8) a bias charge transistor having a gate, a source and a drain, said source of said bias charge transistor connected to said drain of said first first-stage transfer transistor, said drain of said second first-stage transfer transistor, said drain of said third first-stage transfer transistor, and said source of said second-stage transfer transistor;

9) an amplifier having an input and an output;

10) a reset transistor having a gate, a source and a drain, said source of said reset transistor connected to said drain of said second-stage transfer transistor and said input of said amplifier; and b) a common bus connecting said output of said amplifier for each of said pixel cells of said sensor chips to said common bus.

10. The color array according to claim 9 in which said first photo sensitive element is blue, said second photo sensitive element is green and said third photo sensitive element is red.

11. The color array according to claim 9 in which said first photo sensitive element is blue, said second photo sensitive element is red and said third photo sensitive element is green.

12. The color array according to claim 9 in which said first photo sensitive element is red, said second photo sensitive element is green and said third photo sensitive element is blue.

13. The color array according to claim 9 in which said first photo sensitive element is red, said second photo sensitive element is blue and said third photo sensitive element is green.

14. The color array according to claim 9 in which said first photo sensitive element is green, said second photo sensitive element is blue and said third photo sensitive element is red.

15. The color array according to claim 9 in which said first photo sensitive element is green, said second photo sensitive element is red and said third photo sensitive element is blue.

* * * * *